(12) United States Patent
Moose et al.

(10) Patent No.: US 9,780,399 B2
(45) Date of Patent: Oct. 3, 2017

(54) ELECTRODE ASSEMBLY WITH INTEGRATED REINFORCEMENT LAYER

(75) Inventors: Scott C. Moose, Victor, NY (US); Scott L. Peters, Pittsford, NY (US); Timothy J. Fuller, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 900 days.

(21) Appl. No.: 13/434,898

(22) Filed: Mar. 30, 2012

(65) Prior Publication Data
US 2012/0189942 A1    Jul. 26, 2012

Related U.S. Application Data

(63) Continuation-in-part of application No. 11/972,817, filed on Jan. 11, 2008.

(51) Int. Cl.
| | | |
|---|---|---|
| H01M 8/10 | (2016.01) | |
| H01M 8/1004 | (2016.01) | |
| H01M 4/88 | (2006.01) | |
| H01M 8/1058 | (2016.01) | |

(Continued)

(52) U.S. Cl.
CPC ....... H01M 8/1004 (2013.01); H01M 4/8825 (2013.01); H01M 4/8892 (2013.01); H01M 8/1058 (2013.01); H01M 8/1069 (2013.01); H01M 2008/1095 (2013.01); Y02P 70/56 (2015.11)

(58) Field of Classification Search
CPC ....... H01M 2008/1095; H01M 4/8825; H01M 4/8892; H01M 8/1004; H01M 8/1058; H01M 8/1069; H01M 8/00
See application file for complete search history.

(56) References Cited

U.S. PATENT DOCUMENTS

| | | |
|---|---|---|
| 4,187,390 A | 2/1980 | Gore |
| 4,849,253 A | 7/1989 | Maricle et al. |
| 5,318,863 A | 6/1994 | Dhar |

(Continued)

FOREIGN PATENT DOCUMENTS

| | | |
|---|---|---|
| CN | 1108818 A | 9/1995 |
| CN | 1414652 A | 4/2003 |

(Continued)

OTHER PUBLICATIONS

U.S. Non-Final Office Action dated Feb. 3, 2015 pertaining to patent U.S. Appl. No. 13/005,587, filed Jan. 13, 2011.

(Continued)

*Primary Examiner* — Carlos Barcena
(74) *Attorney, Agent, or Firm* — Quinn IP Law (57) ABSTRACT

An electrode assembly and a method of making an electrode assembly. One embodiment of the method includes coating an ionomer solution onto a catalyst coated diffusion media to form a wet ionomer layer, and applying a porous reinforcement layer to the wet ionomer layer such that the wet ionomer layer at least partially impregnates the reinforcement layer. Drying the wet ionomer layer with the impregnated reinforcement layer and joining it to the catalyst coated diffusion media forms an assembly that includes an integrally-reinforced proton exchange membrane layer. This layer may be additionally joined to other ionomer layers and other catalyst coated diffusion media such that a membrane electrode assembly is formed.

21 Claims, 6 Drawing Sheets

(51) Int. Cl.
H01M 8/1069 (2016.01)
H01M 8/1018 (2016.01)

(56) References Cited

U.S. PATENT DOCUMENTS

| | | |
|---|---|---|
| 6,524,736 B1 | 2/2003 | Sompalli et al. |
| 8,142,957 B2 | 3/2012 | Zhang et al. |
| 2004/0214064 A1 | 10/2004 | Cavalca et al. |
| 2005/0019649 A1* | 1/2005 | Kakutani ............ H01M 4/8605 429/128 |
| 2005/0164072 A1* | 7/2005 | Yan et al. ................. 429/42 |
| 2005/0233067 A1 | 10/2005 | Gascoyne et al. |
| 2006/0045985 A1 | 3/2006 | Kozak |
| 2006/0154127 A1* | 7/2006 | Eritate ............... H01M 4/8605 429/483 |
| 2007/0087245 A1 | 4/2007 | Fuller et al. |
| 2007/0213203 A1* | 9/2007 | Sompalli et al. ........... 502/101 |
| 2007/0227650 A1 | 10/2007 | Yan et al. |
| 2007/0275291 A1* | 11/2007 | Gu ........................ B32B 5/16 429/450 |
| 2008/0143061 A1 | 6/2008 | Steinbach et al. |
| 2008/0251205 A1 | 10/2008 | Zhang et al. |
| 2009/0181276 A1 | 7/2009 | Beutel et al. |
| 2010/0009240 A1 | 1/2010 | Fly et al. |
| 2010/0043954 A1 | 2/2010 | Shimoda et al. |
| 2010/0129730 A1 | 5/2010 | Suzuki |

FOREIGN PATENT DOCUMENTS

| | | | |
|---|---|---|---|
| CN | 1613162 A1 | 5/2005 | |
| CN | 1669166 A | 9/2005 | |
| CN | 1949568 A | 4/2007 | |
| CN | 1949570 A | 4/2007 | |
| CN | 101212054 A | 7/2008 | |
| CN | 101425583 A | 5/2009 | |
| WO | 03/100894 A2 | 12/2003 | |
| WO | 2007/014236 A2 | 2/2007 | |
| WO | WO 2007073500 A2 * | 6/2007 | ............... C08F 8/22 |
| WO | 2007119132 A1 | 10/2007 | |

OTHER PUBLICATIONS

Non-Final Office Action dated Aug. 1, 2012 pertaining to U.S. Appl. No. 13/005,587, filed Jan. 13, 2011.

Final Office Action dated Nov. 23, 2012 pertaining to U.S. Appl. No. 13/005,587, filed Jan. 13, 2011.

Advisory Action dated Jan. 30, 2013 pertaining to U.S. Appl. No. 13/005,587, filed Jan. 13, 2011.

Non-Final Office Action dated Sep. 8, 2011 pertaining to U.S. Appl. No. 11/972,817, filed Jan. 11, 2008.

Final Office Action dated Mar. 19, 2012 pertaining to U.S. Appl. No. 11/972,817, filed Jan. 11, 2008.

Non-Final Office Action dated Jul. 11, 2013 pertaining to U.S. Appl. No. 11/972,817, filed Jan. 11, 2008 (after RCE).

Advisory Action dated Jan. 30, 2013 pertaining to U.S. Appl. No. 12/939,421, filed Nov. 4, 2010.

Non-Final Office Action dated Aug. 7, 2012 pertaining to U.S. Appl. No. 12/939,421, filed Nov. 4, 2010.

Final Office Action dated Nov. 23, 2012 pertaining to U.S. Appl. No. 12/939,421, filed Nov. 4, 2010.

* cited by examiner

ELECTRODE ASSEMBLY WITH INTEGRATED REINFORCEMENT LAYER

STATEMENT OF RELATED CASES

This application is a continuation-in-part of U.S. patent application Ser. No. 11/972,817 filed Jan. 11, 2008, entitled "Method of Making a Proton Exchange Membrane Using a Gas Diffusion Electrode as a Substrate," which is incorporated herein by reference.

BACKGROUND OF THE INVENTION

The invention relates generally to fuel cells, and more particularly to reinforcing the polymer membranes used in fuel cells and to methods of making reinforced polymer membranes such that structural properties of such membranes are enhanced.

Fuel cells, also referred to as electrochemical conversion cells, produce electrical energy by processing reactants, for example, through the oxidation and reduction of hydrogen and oxygen. Hydrogen is a very attractive fuel because it is clean and it can be used to produce electricity efficiently in a fuel cell. The automotive industry has expended significant resources in the development of hydrogen fuel cells as a source of power for vehicles. Vehicles powered by hydrogen fuel cells would be more efficient and generate fewer emissions than today's vehicles employing internal combustion engines.

In a typical fuel cell system, hydrogen or a hydrogen-rich gas is supplied as a reactant through a flowpath to the anode side of a fuel cell while oxygen (such as in the form of atmospheric oxygen) is supplied as a reactant through a separate flowpath to the cathode side of the fuel cell. Catalysts, typically in the form of a noble metal such as platinum, are placed at the anode and cathode to facilitate the electrochemical conversion of the reactants into electrons and positively charged ions (for the hydrogen) and negatively charged ions (for the oxygen). In one well-known fuel cell form, the anode and cathode may be made from a layer of electrically-conductive gas diffusion media (GDM) material onto which the catalysts are deposited to form a catalyst coated diffusion media (CCDM). An electrolyte (also referred to as an ionomer, proton-transmissive or proton-conducting) layer separates the anode from the cathode to allow the selective passage of positively charged ions to pass from the anode to the cathode while simultaneously prohibiting the passage of the generated electrons, which instead are forced to flow through an external electrically-conductive circuit (such as a load) to perform useful work before recombining with the charged ions at the cathode. The combination of the positively and negatively charged ions at the cathode results in the production of non-polluting water as a by-product of the reaction. In another well-known fuel cell form, the anode and cathode may be formed directly on the electrolyte layer to form a structure known as a cathode coated membrane (CCM). Regardless of whether the configuration is CCDM-based or CCM-based, the resulting combination of one or more of the electrodes affixed to one or both opposing sides of the proton-conductive medium is known as a membrane electrode assembly (MEA).

One particular fuel cell configuration, known as the proton exchange membrane or polymer electrolyte membrane (in either event, PEM) fuel cell, has shown particular promise for vehicular and related mobile applications. The proton-conductive membrane that makes up the electrolyte layer of a PEM fuel cell is in the form of a solid (such as perfluorosulfonic acid (PFSA) layer of ionomer, a commercial example of which is Nafion®). An MEA; such that mentioned above, when configured to receive reactants through an appropriate flowpath (such as from a bipolar plate or other fluid delivery device), forms a single PEM fuel cell; many such single cells can be combined to form a fuel cell stack, increasing the power output thereof. Multiple stacks can be coupled together to further increase power output.

Despite advancements, one of the problems with existing PEM fuel cell technology is that forming an MEA from a free-standing electrolyte layer is expensive.

SUMMARY OF THE INVENTION

In accordance with one aspect of the teachings of the present invention, a method of making an MEA is disclosed that includes providing a first CCDM, coating a first ionomer solution onto the CCDM such that a first wet ionomer layer is formed, applying a porous reinforcement layer to the wet ionomer layer such that the wet ionomer layer impregnates at least a portion of the reinforcement layer, and drying the wet ionomer layer with the impregnated reinforcement layer to form a PEM layer. The concept of an MEA, while traditionally understood to include both electrodes (i.e., an anode and a cathode) affixed to the membrane, is extended in the present invention to also include the subset comprising an assembly of just one of the electrodes and the membrane; the nature of which variant is at issue will be apparent from the context.

Optionally, a second ionomer solution may be deposited or otherwise formed on a second CCDM to form a second wet ionomer layer; as with the first wet ionomer layer discussed above, the second wet ionomer layer can be dried, either substantially simultaneously or sequentially relative to the first wet ionomer layer. Likewise, the second ionomer layer can, upon drying, be joined to one or both of the reinforced PEM layer and the second CCDM by hot pressing, laminating or a related approach. In another form, a second ionomer solution may be deposited on the first wet ionomer layer that has been impregnated with the reinforcement layer. An electrode may be attached with and secured to the first or second dried ionomer layers. The ionomers in the first and second solutions may be the same as or different, and either or both may include a solvent. Likewise, the ionomers may be based on sulfonated polyether ketones, aryl ketones, polybenzimidazoles, PFSAs, perfluorocyclobutanes (PFCBs) or the like, while the ionomer solutions further may include chemical degradation mitigation agents to reduce the likelihood of chemical damage to the proton exchange membrane layer. As mentioned above, the porous reinforcement layer may be made of a polymer film, a woven fabric or combinations thereof.

According to another aspect of the invention, an integrally-reinforced MEA is disclosed. In one embodiment, the electrode assembly includes a CCDM and a reinforced PEM layer on the CCDM where the reinforced relationship between the PEM layer and the CCDM arises out of an integrated coupling of the otherwise non-structurally self-supporting ionomer and a porous reinforcement layer.

Optionally, the integrated porous reinforcement layer is made of a polymer film, a woven fabric, or combinations thereof as discussed above in conjunction with the previous aspect. The MEA may additionally include a second ionomer layer formed on a surface of the reinforced PEM layer such that the second ionomer layer is placed on the side of the reinforcement material that is opposite of the first ionomer layer. The ionomer in the second ionomer layer may be different from or the same as the ionomer in the first ionomer layer. Similarly, the one or more ionomer layers may be made from the materials mentioned above in conjunction with the previous aspect, including PFSA, PFCB or related hydrocarbon ionomers. The MEA may be the basis for a fuel cell, which in turn may be a source of motive power for a car, truck, motorcycle or related automobile.

BRIEF DESCRIPTION OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

The invention relates to integrally-reinforced MEAs for fuel cells. A reinforcement layer is integrated into a wet ionomer layer that has been coated onto a CCDM electrode. The reinforcement material will make the entire electrode assembly more durable and less prone to shorting failures. In addition, the use of the reinforcement layer may also allow the overall proton exchange membrane layer to be thinner than a free-standing (also referred to herein as stand-alone) PEM. By such construction, the reinforcement of the coated ionomer layer acts to mimic the structural and electrochemical attributes of a conventional free-standing PEM with a much smaller amount of associated bulk or weight. Furthermore, the approach of the present invention would further reduce the amount of ionomer used, and, as a consequence, the cost of the structure.

Figure 1A:
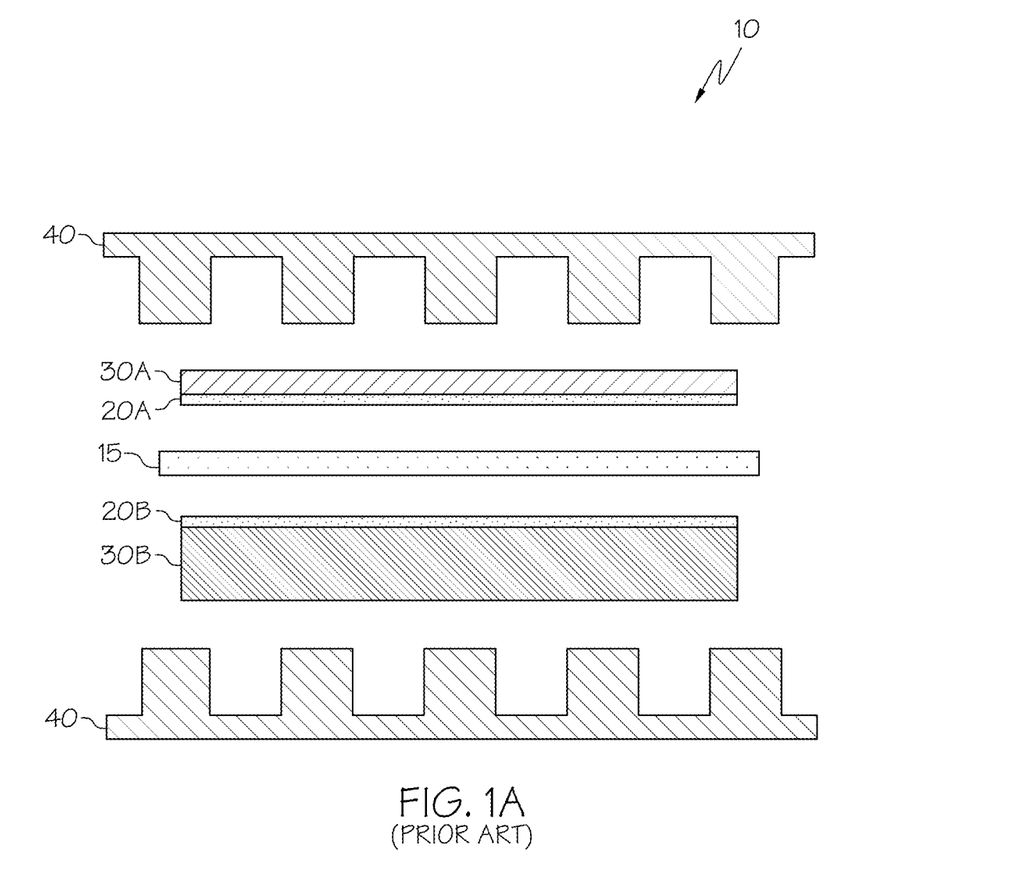
FIG. 1A shows a schematic cross-section of one embodiment of a fuel cell according to the prior art with a free-standing PEM surrounded on opposing sides by CCDMs.
Figure 1B:
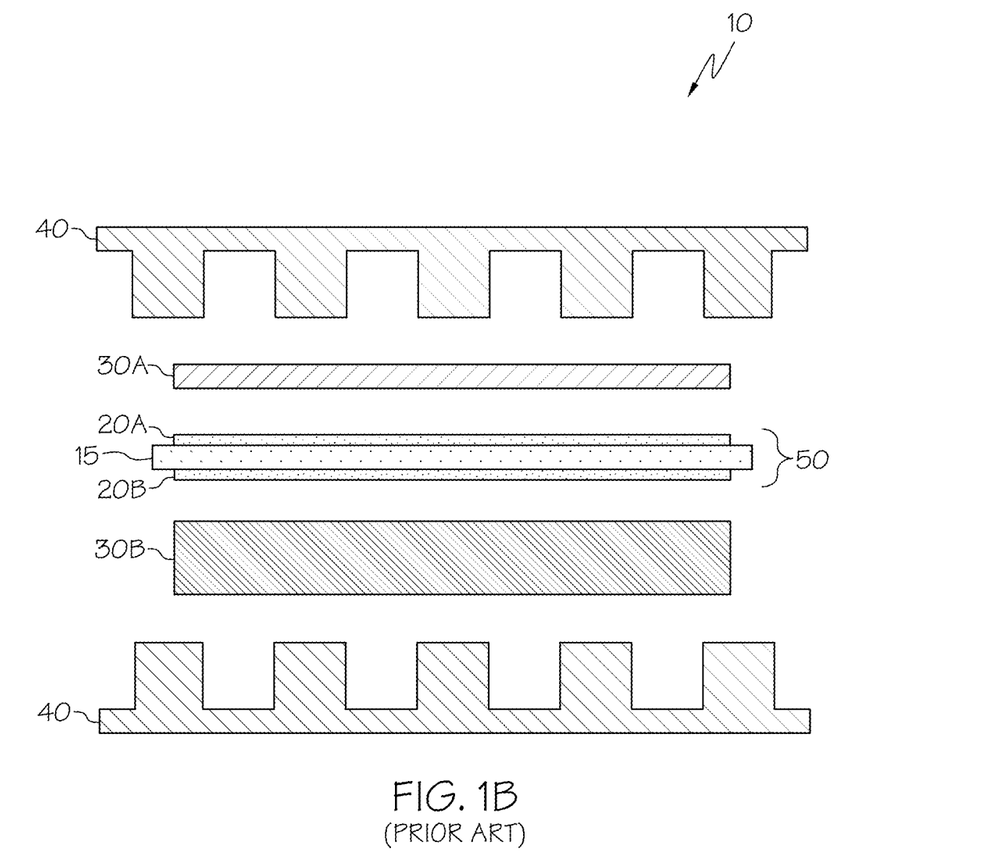
FIG. 1B shows a schematic cross-section of another embodiment of a fuel cell according to the prior art with a free-standing PEM in the form of an MEA.

Referring initially to FIGS. 1A and 1B, partial, sectional views of a PEM fuel cell 10 in exploded form show respectively a CCDM-based configuration and a CCM-based configuration. In either case, the fuel cell 10 includes a substantially planar stand-alone PEM 15 and a pair of catalyst layers 20 (labeled individually as anode catalyst layer 20A and cathode catalyst layer 20B adjacently-facing respective opposing sides of the PEM 15). A pair of diffusion layers 30 (labeled individually as anode diffusion layer 30A and cathode diffusion layer 30B are arranged in facing contact with the respective anode catalyst layer 20A and cathode catalyst layer 20B) are also shown. As shown in the figures, the cathode diffusion layer 30B may be thicker than the anode diffusion layer 30A. Nevertheless, it will be appreciated by those skilled in the art that such differences in thickness are not necessary to the operation of fuel cell 10, and may instead be of substantially comparable thickness. Likewise, it will be appreciated by those skilled in the art that the anode diffusion layer 30A and the cathode diffusion layer 30B may be made of similar or different materials, and that either variant is within the scope of the present invention. Bipolar plates 40 are provided with numerous channels to permit reactant gases to reach the appropriate side of the catalyst layers 20A and 20B, as well as the PEM 15. The diffusion layers 30 provide electrical contact between the respective catalyst layers 20 and the bipolar plates 40 that may additionally act as current collectors. Each of the diffusion layers 30 may be made to define a generally porous construction to facilitate the passage of gaseous reactants to the catalyst layers 20. Suitable materials for the diffusion layers 30 may include (but are not limited to) carbon paper, porous graphite, felts, cloths, mesh or other woven or non-woven materials that include some degree of porosity.

In the CCDM-based approach of FIG. 1A, each diffusion layer 30 acts as the aforementioned GDM or gas diffusion layer (GDL) that can be used as a substrate for the catalyst layers 20 that may be deposited in (for example) ink form. In the CCM-based approach of FIG. 1B, the stand-alone PEM 15 and catalyst layers 20A, 20B collectively define the MEA 50. In either the CCDM-based configuration or the CCM-based configuration, the catalyst layers 20 can be attached, deposited, embedded or otherwise joined to their respective diffusion layers 30. As will be appreciated by those skilled in the art, regardless of whether the resulting MEA 50 includes the CCDM-based configuration where anode and cathode layers 20A, 20B are attached to the respective diffusion layers 30A, 30B, or those same layers 20A, 20B attached to the PEM 15 as part of a CCM-based configuration, a free-standing PEM 15 introduces additional manufacturing steps.

Figure 2:
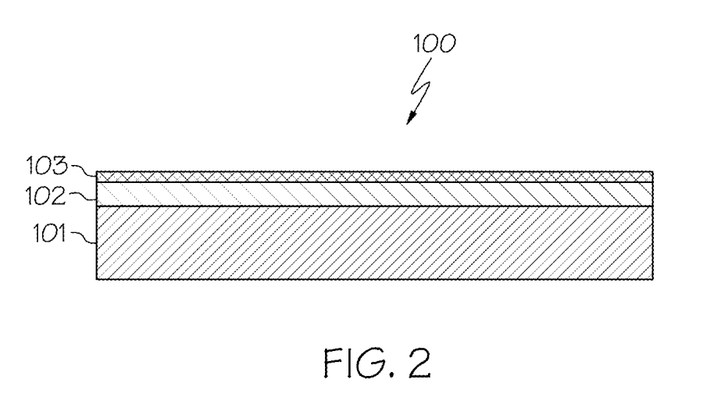
FIG. 2 is a cross-section of one embodiment of CCM.

Referring next to FIG. 2, an individual CCDM 100 that can be used as support for an ionomer layer (discussed in more detail below) is shown. As discussed above, a CCDM is made by affixing or otherwise connecting a catalyst layer 103 (also known as an electrode layer) onto a GDM that includes a diffusion media substrate 101 with a microporous layer 102, where the microporous layer 102 helps with gas diffusion to and water removal from the electrode layer 103. As will be described below and shown in the accompanying drawings, CCDM 100 may be labeled individually (for example, as 100A, 100B or the like) to take into consideration configurations where multiple (and potentially different) CCDMs are employed. The catalyst layer 103 may include suitable catalytic particles, for example, metals such as platinum, platinum alloys and other catalysts known to those skilled in the fuel cell art, and may be applied by any suitable method including, for example, rolling, painting, spraying, Meyer rod, slot die, comma, knife or the like. The diffusion media substrate 101 may be a conventional fuel cell gas diffusion material such as nonwoven carbon fiber paper, woven carbon cloth, or carbon foam, for example. Likewise, the microporous layer 102, which may include particles and a binder, may be applied using any suitable method, such as those mentioned previously. Suitable particles may include, but are not limited to, graphitic, graphitized or other conductive carbon particles, while suitable binders for the microporous layer 102 may include at least one of PTFE, polyvinylidenefluoride (PVDF), fluoroethylene propylene (FEP), or other organic or inorganic hydrophobic materials.

Figure 3:
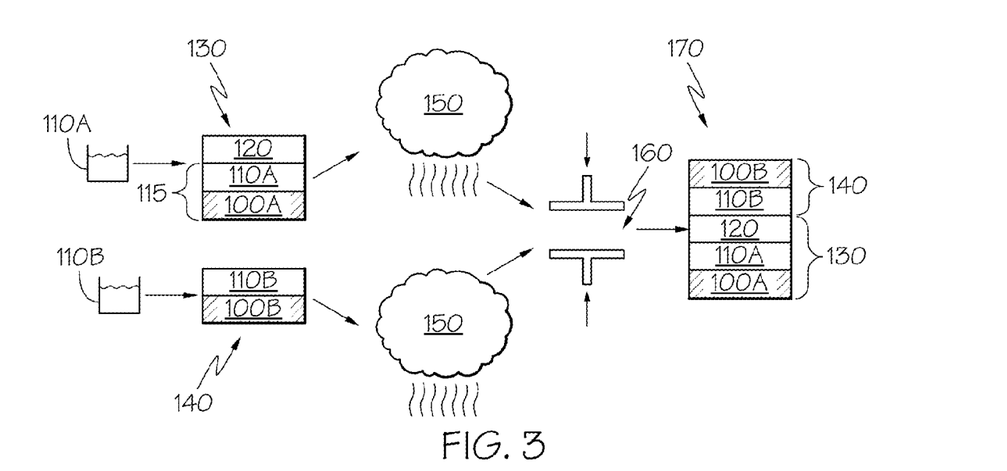
FIG. 3 is a cross-section of one embodiment of CCDM.
Figure 4:
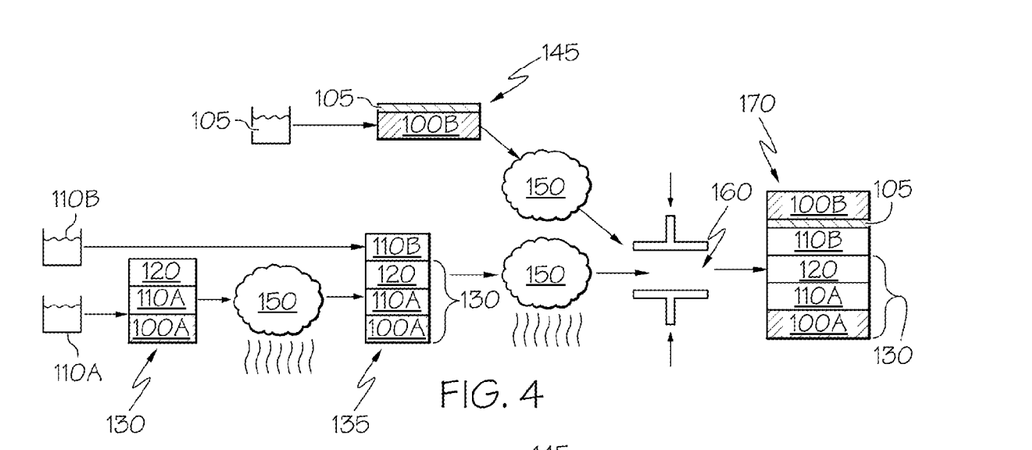
FIG. 4 is an illustration of one method of making a MEA using an electrode assembly with an integrated reinforcement layer.
Figure 5:
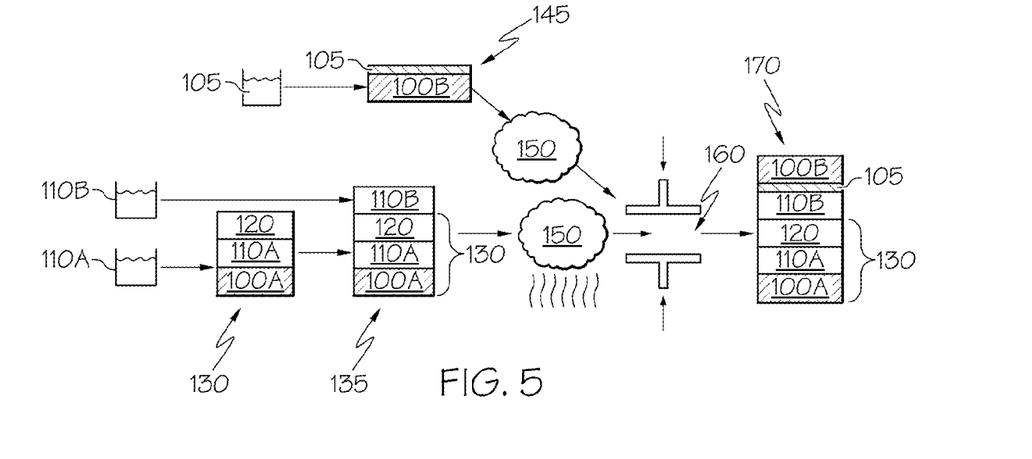
FIG. 5 is an illustration of another method of making a MEA using an electrode assembly with an integrated reinforcement layer.

Referring next to FIGS. 3 through 5, various methods of making an integrally-reinforced MEA 170 using the approach of the present invention are shown. Referring with particularity to FIG. 3, an ionomer solution 110A is coated onto a first CCDM 100A to form a wet PEM precursor layer 115. The ionomer solution 110A typically includes one or more solvents, and may include additional materials, such as compounds to improve the performance and durability of the ensuing membrane. The ionomer used in solution 110A can be any commercially available version, such as the aforementioned PFSA, PFCB or hydrocarbon ionomers such as sulfonated polyether ketones, aryl ketones and polybenzimidazoles. Other proton-conducting polymers could also be used.

The ionomer solution 110A can be deposited onto the first CCDM 100A using any suitable process, including, but not limited to, casting, laminating, imbibing, spraying, slot die, extrusion, rod coating or other conventional liquid coating methods. While the PEM precursor layer 115 formed by the combination of the ionomer solution 110A and first CCDM 100A is still wet, a layer of reinforcement material 120 is applied. In one form, the reinforcement material 120 may be in the form of a screen or related mesh, while in another it can be made from a porous material such as PTFE or an expanded PTFE (ePTFE). In this latter configuration, the wet PEM precursor layer 115 quickly impregnates the pores of the reinforcement material 120 in a manner generally analogous to a paper towel being used to soak up a liquid spill when placed on top of it. The totality of this integration allows a first electrode and ionomer assembly 130 to mimic the respective portions of a separately-formed MEA 50 (such as shown in FIGS. 1A and 1B) that is based on free-standing layer of proton-conductive membrane 15 of the prior art, but without the bulk and cost. The first electrode and ionomer assembly 130 is then subjected to drying 150.

Figure 8:
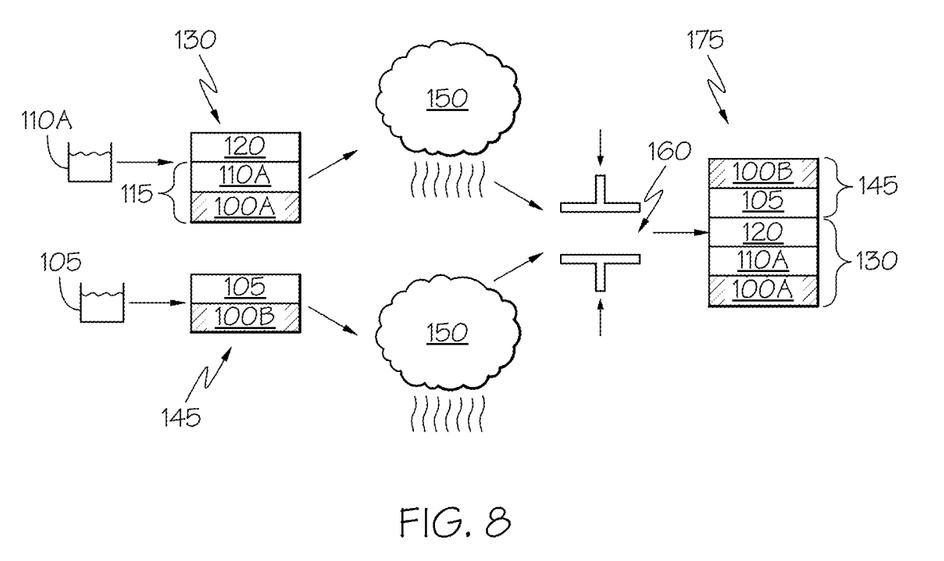
FIG. 8 is an illustration of yet another method of making a MEA using an electrode assembly with an integrated reinforcement layer.

As shown in the lower left of FIG. 3, a second CCDM 100B is coated with a second ionomer layer 110B to form a second electrode and ionomer assembly 140 that may be similar to the first electrode and ionomer assembly 130 except for the presence of the reinforcement material 120. As with the first electrode and ionomer assembly 130, the second electrode and ionomer assembly 140 can be subjected to a drying 150 step to remove solvents, cure, harden or otherwise prepare it for the next processing step. In a preferred approach, the drying 150 of the two different assemblies 130 and 140 are performed separately from one another; such would be particularly appropriate where different precursor materials are used, although it will be appreciated by those skilled in the art that the first and second ionomer solutions 110A and 110B can use the same or different materials. The second electrode and ionomer assembly 140 can be combined with the reinforced first electrode and ionomer assembly 130 by any suitable method, such as hot pressing or laminating 160, to form MEA 170. As mentioned above, the first and second electrode and ionomer assemblies 130, 140 are subsets of MEA 170 such that any or all qualify as an assembled membrane and electrode. The first and second CCDMs 100A and 100B may be the same or different structures. In one example of difference as mentioned above, the second CCDM 100B (if configured to occupy the cathode side of the MEA 170) could be thicker in either material of composition or dimension than the first CCDM 100A used on the anode side of MEA 170. It is important to note in the present context that each of FIGS. 3 through 5 assume that a second ionomer layer 110B is applied, either on top of the first electrode and ionomer assembly 130 (such as depicted in FIGS. 4 and 5) or on the second CCDM 100B (as depicted in FIG. 3). Nevertheless, another valid construction is shown in FIG. 8, where the first ionomer solution 110A is coated onto the first CCDM 100A, after which the reinforcement layer 120 is applied while the coating is wet to produce a first electrode ionomer assembly 130 similar to that depicted in FIGS. 3 through 5. After this, drying 150 and then hotpressing or laminating 160 to the second electrode 100B is done with optionally coated thin ionomer layer 105 that is coated onto the second electrode 100B and subjected to its own heating step to produce a modified form 145 of the second electrode ionomer assembly. Upon laminating the two electrode ionomer assemblies 130 and 145 together, a modified MEA 175 is produced that is generally similar to the MEAs 170 depicted in FIGS. 3 through 5 with the exception of the second ionomer layer 110B. As such, the difference with the embodiment of FIG. 8 is that all the first ionomer solution 110A is coated initially such that the second ionomer solution 110B is not needed The reinforcement material 120 may be any porous material that will help provide a support or reinforcement layer for the resulting MEA 170. Suitable porous materials include, but are not limited to, polymer films, woven fabrics, and the like, where one particularly useful form of the porous polymer films includes the aforementioned ePFTE or the like. Because of the ready uptake of the ionomer solution 110A by the layer of reinforcement material 120, the present inventors determined that applying reinforcement material 120 as soon as possible onto the wet PEM coating 115 reduces the amount of soak-in of the ionomer into the CCDM 100A; such soak-in may also depend on the porosity and hydrophobicity or hydrophilicity of CCDM 100A. Soak-in also depends on ionomer liquid formulation (i.e. solvent to water ratios viscosity, solvent type and ionomer properties, such as equivalent weight). It will be appreciated by those skilled in the art that, subject to these properties, any commercially available CCDM is suitable for use as the first and second CCDMs 100A and 100B.

Referring with particularity to FIG. 4, in an alternative approach, the second ionomer layer 110B can be coated onto the first electrode and ionomer assembly 130 in general, and onto the reinforcement material 120 portion in particular. As shown with even greater particularity, the second ionomer layer 110B is coated onto the opposite major planar surface of the reinforcement material 120 from that of the first ionomer layer 110A. In this embodiment, it is preferable to apply the second ionomer layer 110B directly to the reinforcement material 120 planar surface. As with the approach of FIG. 3, this reinforced first electrode and ionomer assembly 130 may be subjected to drying 150 in general, as well as to separate sequential drying 150 steps as shown both before and after the addition of the second ionomer layer 110B. In one form, the second ionomer layer 110B is applied directly to the surface of the reinforcement material 120 after the first ionomer layer 110A has been dried, while in another form (as shown in FIG. 5) the second ionomer layer 110B can be applied while the first electrode and ionomer assembly 130 is wet, if desired. In either event, it is preferable to have the first and second ionomer layers 110A and 110B be dried before the second CCDM 100B is applied. As before, a second CCDM 100B can be combined to produce MEA 170, this time as a separate layer after the drying 150 but before any laminating 160. Optionally, a thin ionomer layer 105 may be coated and dried on CCDM 100B prior to laminating 160. Such a layer may be useful in certain hot press or related joining approaches, where the surface of second CCDM 100B acts as a bare electrode without a lot of binding material. By including a thin optional ionomer layer 105 onto the bare electrode surface, it helps with adhesion during subsequent hot pressing or other joining methods.

As mentioned above, ionomer solution 110A (as well as 110B) may include water, alcohols and related solvents in addition to the proton-conductive ionomer. Suitable organic solvents for PFSA include, but are not limited to, alcohols, such as diacetone alcohol (DAA), isopropyl alcohol (IPA), methanol, ethanol, n-propanol or combinations thereof. The present inventors have discovered that, depending on the ionomer source (or supplier), an alcohol-rich (rather than water-rich) solution facilitates rapid filling of the porous reinforcement material 120, while in others, there need not be a greater amount of alcohol (or other organic solvent) than water. In the present context, an alcohol-rich solvent is one that has either alcohol as a majority of constituent, or in cases where the alcohol is not a majority is at least the dominant one in terms of weight or volume percentage. In addition to alcohols, other suitable solvents may include dimethylacetamide, dimethyl sulfoxide, N-methyl-2-pyrrolidone, dimethyl formamide or combinations thereof. Thus, when dealing with ionomers where it is desirable to be alcohol-rich, some water may also be present, although as mentioned above, probably in concentrations less than that of the alcohol or other solvents. Contrarily, in situations using ionomers (such as Nafion®) that appear to be less sensitive to such ratios, equal amounts (or even water-rich ratios) may be preferred.

The present inventors have further discovered that controlling the viscosity is also a valuable way to ensure proper saturation of the reinforcement layer 120 with the ionomer solution 110A. For example, one way to change the viscosity is to adjust the percentage of solids in the solution; this can be done by dilution or concentration. Alternatively, the ratio of organics to water can also regulate the viscosity. Likewise, the ionomer is made from known proton-conductive materials that include perfluorosulfonic acid, perfluorocyclobutane or hydrocarbon ionomers. Suitable solvents for PFCB include, but are not limited to, dimethylacetamide (DMAC), dimethyl sulfoxide (DMSO), N-methyl-2-pyrrolidone (NMP), dimethyl formamide (DMF), and alcohols such as those listed above. Given the right combination of solvents and viscosity, the present inventors found that the reinforcement material 120 was surprisingly easy to fill with ionomer solution 110A.

As such, the present inventors determined that a number of the above factors affect how quickly and completely the reinforcement material 120 is filled. Thus, the particular type of ionomer 110A used, the type of alcohol used, the solvent ratio, the viscosity, the time frame from coating the liquid ionomer 110A to applying the reinforcement material 120, and the type and properties of the reinforcement material 120 may all need to be taken into consideration, although the present inventors believe that the most important factors for a particular ionomer and ionomer supplier are viscosity, solvent selection and solvent ratio. Generally (as stated above), in order to fill quickly, the ionomer solutions 110A, 110B should be alcohol-rich, as opposed to water-rich, although being alcohol-rich isn't absolutely essential in order to have adequate filling of the reinforcement material 120. Furthermore, depending on the nature of the reinforcement material 120, lower alcohols (such as methanol) tend to not fill as well as higher alcohols (such as propanols). Thus, for a hydrophobic reinforcement material like ePTFE, higher alcohols (which also tend to be more hydrophobic) tend to be more compatible with (and therefore more readily capable of filling) the reinforcement material 120, whereas lower alcohol-based ionomer solutions used with ePTFE reinforcements tends to not fill as well. It will be appreciated by those skilled in the art that certain solvents work better with certain ionomers, and that tailoring the amount and type of solvent to a particular ionomer is within the scope of the present invention. For example, diluting or otherwise changing the ionomer solution (such as through the addition of n-propyl alcohol) can be used to speed up and more thoroughly fill the pores, while other ionomer solutions may not be tolerant of such diluting agents, requiring instead others (such as an ethanol-based solvent). Likewise, the use of water or higher viscosity may help keep the deposited ionomer solution at or near the top of the respective porous electrodes of CCDMs 100A and 100B rather than soaking in; this is especially useful in situations where a hydrophobic material (such as PTFE) is present. Because the use of one or both of water and higher viscosity is expected to affect the filling of the reinforcement material 120, the present inventors believe that optimal formulation windows for each ionomer material may need to be established for these two parameters.

Referring next to FIG. 5, another alternate approach is shown. In it, the drying 150 is delayed until after the first electrode and ionomer assembly 130 has been subsequently coated with a second wet ionomer layer 110B. As such, it is generally similar to the approach of FIG. 4, with the exception that only a single drying 150 step is used. This method of application assures that the reinforcement material 120 is completely filled, as both of its sides receive ionomer, the first in the form of first wet ionomer layer 110A and the second in the form of a second wet ionomer layer 110B. Placing the second wet ionomer layer 110B immediately after applying the reinforcement material layer 120 may eliminate the need for a separate second coating pass, thereby simplifying the process. While it would be possible to eliminate the additional coating pass by placing two coating stations and related drying equipment in series, such an approach would require additional capital expenditure for such equipment. The approach depicted in FIG. 5, with its coating of the second wet ionomer layer 110B on the still-wet ionomer assembly 130 eliminates the need for such duplicative equipment. As with the embodiment depicted in FIG. 4, the embodiment of FIG. 5 may optionally include a thin ionomer layer 105 to facilitate adhesion or bonding.

Figure 6:
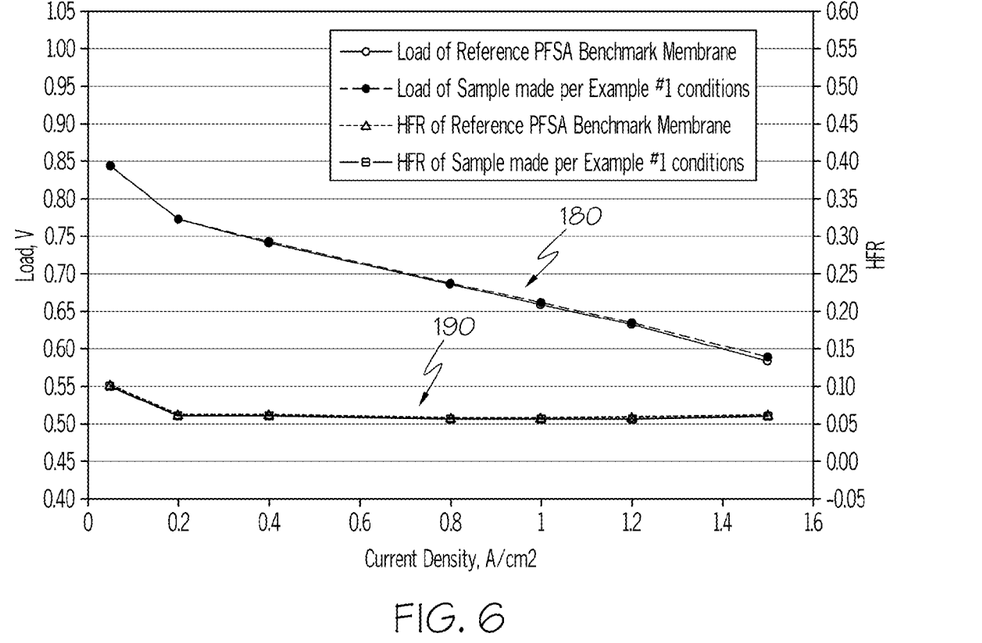
FIG. 6 is an illustration of a polarization plot for a cathode CCDM made according to a first example.
Figure 7:
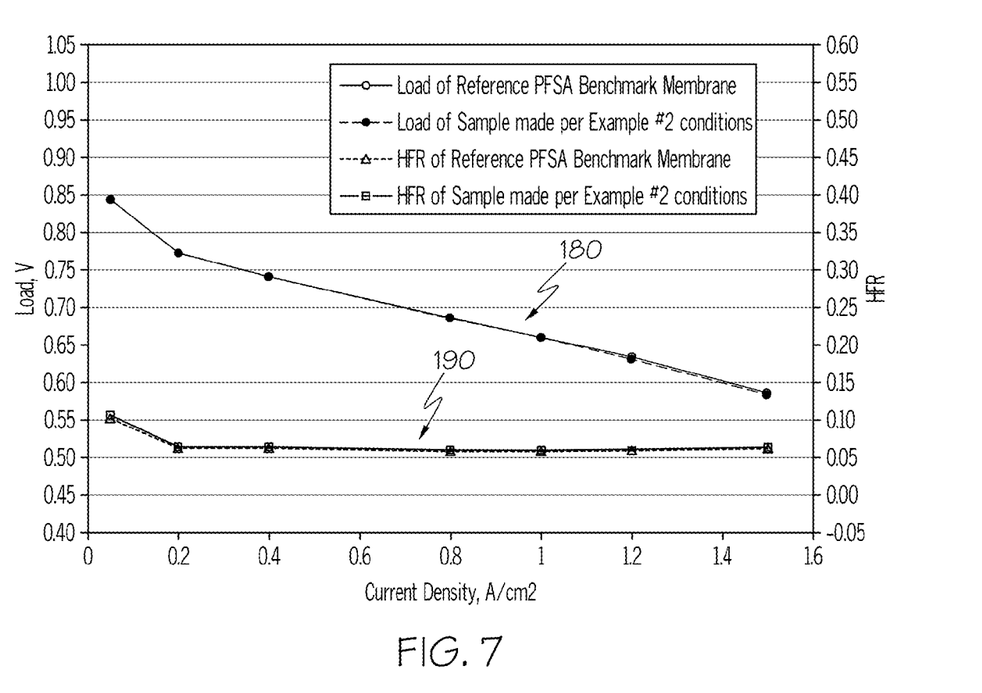
FIG. 7 is an illustration of a polarization plot for a cathode CCDM according to a second example.

Referring again to FIG. 3, in one example, a CCDM 100A produced in-house was coated with an ionomer solution 110A containing 14.4% by weight ionomer (specifically, a commercially-available form of Nafion® known as D2020) in 54.3% n-propanol and 45.7% water solvent. In one form, the as-supplied Nafion® D2020 ionomer contains approximately 20-22% solids and 57.5/42.5 volatile organic compound (VOC)-to-water ratio. It will be appreciated by those skilled in the art that VOCs may include a mixture of various compounds, such as n-propanol, ethanol, and some ethers (where in one particular form, over 95% of the VOC is in the form of n-propanol). The present inventors have found that this may be diluted with solvents as a way to lower the viscosity in order to help it fill ePTFE reinforcement material 120 (such as Donaldson D1326) that was applied to the surface. While the ionomer solution 110A was still wet after the reinforcement material 120 is applied, the combined composite layer (i.e., the wet precursor layer 115) was subjected to drying 150 to form a reinforced MEA (such as first reinforced electrode and ionomer assembly 130 or second electrode and ionomer assembly 140). The CCDM 100A with the first electrode and ionomer assembly 130 formed a reinforced PEM layer that was then hot pressed to a second CCDM 100B that only had an ionomer layer 110B (i.e., no reinforcement material) coated onto it and subjected to separate drying 150. Ionomer assemblies 130 and 140 are annealed at elevated temperatures for various durations of time, depending on the ionomers; such a process improves durability of the resulting MEA 170. In the case of the two examples that correspond to FIGS. 6 and 7, the inventors annealed the assemblies at 140° C. for 1 hour in an inert nitrogen atmosphere; this step is conducted before the hot pressing. In one form, hot pressing conditions used in formation of MEA 170 with first CCDM 100A and second CCDM 100B take place at about 295° F. and at about 4000 pounds for about 2 minutes. The first example, in conjunction with FIG. 6 below, corresponds to a substantially complete (i.e., anode, electrolyte and cathode) MEA 170 such as that made by the process shown in FIG. 3, where both ionomer assemblies 130 and 140 are present. The second example, in conjunction with FIG. 7, shows the results of ionomer assembly 130 alone (including ionomer solution 110B) being formed into a new interim component 135 (which may be thought of as a partial MEA, for example), as shown by the process depicted in FIG. 4. In one form, the second CCDM 100B need not be subjected to annealing even though it has thin layer of ionomer 105 on it.

Furthermore, relative humidity (RH) cycling tests without load were conducted to evaluate the mechanical durability of MEAs 170 containing membranes with reinforced layers. In one preferred form, a first ionomer coating thickness is about 80 microns wet (which equates to approximately 6 microns dry), while a second ionomer coating thickness is an additional 60 to 80 microns wet (i.e., 4 to 6 microns dry). Thus, a liquid layer being applied to a thickness of 80 microns dries to a thickness of 6 microns of remaining ionomer. For each test, 38 cm$^2$ active area graphite plates with 2 mm width straight channels and lands were used for the cell build. The RH cycling tests were conducted at 80° C. with an ambient outlet gas pressure, while 20 standard liters per minute (SLPM) constant flow rate of air was introduced into both an anode side and a cathode side of the cell in a counter-flow format. These air supplies were periodically passed or by-passed through humidifiers controlled at 90° C. to achieve either 150% RH or 0% RH with a duration of 2 minutes at each condition. The MEA failure criteria was arbitrarily defined as 10 standard cubic centimeters per minute (SCCM) crossover gas leak from anode to cathode or vice versa. The RH cycling durability tests (in unloaded condition) were run, and the part showed no signs of failure for over 20,000 cycles. The size of the MEA 170 made by the present invention for use in testing was set at about 38 cm$^2$ active area. As will be discussed in more detail below, the testing to simulate operational conditions produced the results shown in the polarization curves of FIGS. 6 and 7.

Beginning of life (BOL) performance data also shows similar improved results. Referring next to FIGS. 6 and 7, polarization curves are shown for two exemplary conditions. The benefit depicted in these curves is that the MEAs 170 made by the methods of the present invention are achieving equivalent performance to that of conventional MEAs (such as MEA 50 of FIG. 1B that employs a stand-alone PEM 15); thus, while performance-related parameters (such as the load, current density and HFR values depicted in the curves) are substantially unimpacted, the simplified process relative to that used to produce stand-alone membranes significantly contributes to achieving fabrication-related cost savings. The polarization curves are used to compare the load (voltage) and HFR as a function of the applied current density. In each figure, the upper portion plots 180 are associated with load (left side of the Y-axis) results, while the lower portion plots 190 correspond to the HFR (right side of the Y-axis) results. With both plots 180 and 190 in both examples, there is substantial similarity in the measures of performance (i.e., both voltage and HFR) across a wide range of applied currents.

Referring with particularity to FIG. 6, in a first example, the MEA 170 was made via the process identified in FIG. 3. In particular, a cathode version of an ionomer assembly 130 that makes up a portion of MEA 170 with a 0.4 mg/cm$^2$ Pt loading was made from 80 microns of 14.4% solids Nafion® D2020 ionomer that was coated onto the CCDM 100A and then the ePTFE reinforcement material 120 is laid on top of the coating in a manner similar to that of the paper towel analogy mentioned above. The solvent ratio of the wet ionomer was 54.3% n-propanol and 45.7% water. As mentioned above, the 80 microns wet is equivalent to about 6 microns dry. Infrared (IR) ovens set at 400° F. for 6 minutes approximately 12 inches above the coating surface were used to dry the wet laid ionomer. Likewise, anode version of an ionomer assembly 140 includes a CCDM 100B has a 0.05 mg/cm$^2$ Pt loading and was coated with 60 microns wet (i.e., about 4 to 5 microns dry) of 10% solids Nafion® D2020 ionomer with solvent ratio of 25.3% n-propanol and 74.7% water. CCDM 100B was subjected to the same drying conditions as above for CCDM 100A, while the hot pressing conditions were as discussed above.

Referring with particularity to FIG. 7, in a second example, cathode CCDM 100A has a 0.4 mg/cm$^2$ Pt loading as in the first example, made from 80 microns of 14.4% solids Nafion® D2020 ionomer with ePTFE reinforcement material 120 as discussed in the previous paragraph. The solvent ratio is 54.3% n-propanol and 45.7% water. As mentioned above, the 80 microns wet is equivalent to about 6 microns dry. The drying was similar to that discussed above using IR ovens. In this case, CCDM 100A with a layer of ionomer solution 110A on ePTFE reinforcement material 120 is then recoated with 60 microns of the same 14.4% D2020 solution with the 54.3/45.7 solvent ratio; these steps are depicted with particularity in FIG. 4. As before, it is dried under IR at 400° F. for 6 minutes. CCDM 100B (which corresponds to the anode) has, as mentioned above, a 0.05 mg/cm$^2$ Pt loading. Unlike CCDM 100A cathode, the CCDM 100B anode was coated with a thin ionomer overcoat (i.e., ionomer solution 110B) such that less than approximately 1 micron of the ionomer is formed on the surface.

Thus, in the example that corresponds to FIG. 6, relatively thick layers of ionomer solution 110A, 110B are coated onto respective CCDMs 100A and 100B. They are brought together in hot pressing (as shown as step 160 in FIGS. 3 and 4 (as well as 5) and because there is ionomer on both CCDMs, there is good adhesion. In the example that corresponds to FIG. 7, all of the ionomer solution is being deposited onto CCDM 100A. The application of a very thin ionomer layer 105 onto CCDM 100B (such as shown in FIGS. 4 and 5) helps with the subsequent hot pressing 160 to promote ionomer-to-ionomer contact for adhesion. If thin ionomer layer 105 were not added to CCDM 100B, the hotpressing 160 would be against the ionomer from a CCDM 100A side to an electrode surface (i.e., the carbon catalyst), which would not adhere as well. Thus, while not required, the thin ionomer layer 105 may be beneficial, and was used for the second example of FIG. 7 above. Drying was conducted with IR heating at 400° F. for 4 minutes at approximately 12 inches distance from the coating for the thin ionomer 105. While the Pt loadings mentioned above for the respective cathode and anode variants 100A and 100B mentioned in the above examples are fairly typical, the present inventors have investigated lower cathode loadings and have seen similar performance retention.

Although not shown, a sub-gasket is preferably used in between the anode and cathode and prevents electrical shorting around their edges where anode and cathode parts cut to size with a conventional CCDM would otherwise leave stray paper fibers and exposed, unprotected edges at the cut site that could lead to inadvertent shorts between opposing electrode edges. As such, a subgasket is used to cover a small portion of the edges. In examples made in accordance with the present invention, the inventors used a 1 mil thick Kapton subgasket with a 38 $cm^2$ opening.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, for the purposes of describing and defining the present invention, it is noted that the term "device" is utilized herein to represent a combination of components and individual components, regardless of whether the components are combined with other components. For example, a "device" according to the present invention may comprise an electrochemical conversion assembly or fuel cell, as well as a larger structure (such as a vehicle) that incorporates an electrochemical conversion assembly according to the present invention. Moreover, the term "substantially" is utilized herein to represent the inherent degree of uncertainty that may be attributed to any quantitative comparison, value, measurement, or other representation. As such, it may represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a membrane electrode assembly, the method comprising:
   providing a first catalyst coated diffusion media with a surface defined thereon; and
   forming a reinforced polymer electrolyte membrane on the first catalyst coated diffusion media, the forming comprising:
      coating a first ionomer solution onto the first catalyst coated diffusion media to form a first wet proton exchange membrane precursor layer on the surface thereof;
      applying a porous reinforcement layer to the first wet proton exchange membrane precursor layer such that the first wet proton exchange membrane precursor layer at least partially impregnates the porous reinforcement layer;
      drying the first wet proton exchange membrane precursor layer with the impregnated porous reinforcement layer such that both are secured to one another and to the first catalyst coated diffusion media to form a first reinforced membrane electrode assembly;
      coating a second ionomer solution onto a second catalyst coated diffusion media with a surface defined thereon to form a second wet proton exchange membrane precursor layer on the surface thereof;
      drying the second wet proton exchange membrane precursor layer; and
      joining the second proton exchange membrane precursor layer and second catalyst coated diffusion media to the impregnated porous reinforcement layer.

2. The method of claim 1, wherein the drying of the first wet proton exchange membrane precursor layer and the second wet proton exchange membrane precursor layer takes place independently of one another.

3. The method of claim 1, wherein the joining step includes laminating.

4. The method of claim 1, wherein the joining step includes hot pressing.

5. The method of claim 1, wherein the ionomer in the first ionomer solution is different from the ionomer in the second ionomer solution.

6. The method of claim 1, wherein a proton-conductive ionomer in the first ionomer solution is substantially the same as a proton-conductive ionomer in the second ionomer solution.

7. The method of claim 1, wherein at least one of the first and second ionomer solutions comprises a proton-conductive ionomer and a solvent.

8. The method of claim 7, wherein the solvent is alcohol-rich.

9. The method of claim 1, wherein the porous reinforcement layer is made of a polymer film, a woven fabric or combinations thereof.

10. The method of claim 9, wherein the polymer film of the porous reinforcement layer comprises expanded polytetrafluoroethylene.

11. The method of claim 1, wherein the coating of the second ionomer solution takes place prior to the drying of the first wet proton exchange membrane precursor layer.

12. The method of claim 1, wherein the coating of the second ionomer solution takes place after the drying of the first wet proton exchange membrane precursor layer.

13. The method of claim 1, wherein the joining of the second proton exchange membrane precursor layer and the second catalyst coated diffusion media to the impregnated porous reinforcement layer occurs after the drying of the first and second wet proton exchange membrane precursor layers.

14. A method of making a membrane electrode assembly, the method comprising:
   providing a first catalyst coated diffusion media with a surface defined thereon;
   forming a reinforced polymer electrolyte membrane on the first catalyst coated diffusion media, the forming comprising:
      coating a first ionomer solution onto the surface of the first catalyst coated diffusion media to form a first wet proton exchange membrane precursor layer;

applying a porous reinforcement layer to the first wet proton exchange membrane precursor layer such that the first wet proton exchange membrane precursor layer at least partially impregnates the porous reinforcement layer; and drying the first wet proton exchange membrane precursor layer with the at least partially impregnated porous reinforcement layer such that both are secured to one another and to the first catalyst coated diffusion media to form a first reinforced membrane electrode assembly;

coating a second ionomer solution onto the at least partially impregnated porous reinforcement layer;

placing a second catalyst coated diffusion media onto the second ionomer solution or the at least partially impregnated porous reinforcement layer, or both, after the second ionomer solution has been dried; and joining the second catalyst coated diffusion media and the dried second ionomer layer to the at least partially impregnated porous reinforcement layer.

15. The method of claim 14, wherein the joining step includes laminating or hot pressing.

16. The method of claim 14, wherein the joining step occurs after the drying of the first wet proton exchange membrane precursor layer.

17. A method of making a membrane electrode assembly, the method comprising:

coating a first ionomer solution onto a first catalyst coated diffusion media to form a first wet proton exchange membrane precursor layer;

applying a porous reinforcement layer to the first wet proton exchange membrane precursor layer such that the first wet proton exchange membrane precursor layer at least partially impregnates the porous reinforcement layer;

drying the first wet proton exchange membrane precursor layer with the at least partially impregnated porous reinforcement layer such that both are secured to one another and to the first catalyst coated diffusion media to form a reinforced membrane electrode assembly; and after drying the first wet proton exchange membrane precursor layer, coating a second ionomer solution onto the at least partially impregnated porous reinforcement layer.

18. The method of claim 17, wherein an ionomer in the first ionomer solution is different from an ionomer in the second ionomer solution.

19. The method of claim 17, wherein a proton-conductive ionomer in the first ionomer solution is substantially the same as a proton-conductive ionomer in the second ionomer solution.

20. The method of claim 17, wherein at least one of the first and second ionomer solutions comprises a proton-conductive ionomer and a solvent.

21. The method of claim 17, wherein the porous reinforcement layer includes a polymer film, a woven fabric, or a combination thereof.

* * * * *